US009900876B2

(12) United States Patent
Gao et al.

(10) Patent No.: US 9,900,876 B2
(45) Date of Patent: Feb. 20, 2018

(54) REPETITION TRANSMISSION FOR DOWNLINK CONTROL SIGNAL

(71) Applicant: AVAGO TECHNOLOGIES GENERAL IP (SINGAPORE) PTE. LTD., Singapore (SG)

(72) Inventors: Chunyan Gao, Beijing (CN); Na Wei, Beijing (CN); Shuang Tan, Beijing (CN); Erlin Zeng, Beijing (CN); Haiming Wang, Beijing (CN); Wei Bai, Beijing (CN)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 233 days.

(21) Appl. No.: 14/761,851

(22) PCT Filed: Jan. 18, 2013

(86) PCT No.: PCT/CN2013/070659
§ 371 (c)(1),
(2) Date: Jul. 17, 2015

(87) PCT Pub. No.: WO2014/110781
PCT Pub. Date: Jul. 24, 2014

(65) Prior Publication Data
US 2015/0365924 A1 Dec. 17, 2015

(51) Int. Cl.
*H04W 4/00* (2009.01)
*H04W 72/04* (2009.01)
(Continued)

(52) U.S. Cl.
CPC ............. *H04W 72/042* (2013.01); *H04L 1/08* (2013.01); *H04L 1/189* (2013.01)

(58) Field of Classification Search
CPC ......... H04W 72/042; H04L 1/08; H04L 1/189
See application file for complete search history.

(56) References Cited

U.S. PATENT DOCUMENTS

| 2006/0080459 A1* | 4/2006 | Nanri | .................... H04L 1/0025 709/237 |
|---|---|---|---|
| 2009/0046650 A1 | 2/2009 | Dalsgaard et al. | |

(Continued)

FOREIGN PATENT DOCUMENTS

| CN | 101370247 A | 2/2009 |
|---|---|---|
| CN | 101796761 A | 8/2010 |

(Continued)

OTHER PUBLICATIONS

CATT (3GPP TSG RAN WG1 Meeting #71, "Analysis of coverage improvement for low cost MTC LTE UEs", New Orleans, USA, Nov. 12-16, 2012, R1-125247).*

(Continued)

*Primary Examiner* — Maharishi Khirodhar
(74) *Attorney, Agent, or Firm* — Oblon, McClelland, Maier & Neustadt, L.L.P.

(57) ABSTRACT

The present invention addresses a method, apparatus and computer program product for enabling enhanced repetition transmission for downlink control signal to improve machine type communication coverage. One or a plurality of downlink control channel signaling window lengths is/are predefined, a start position of a window in which repetition of download control signal is allowed is determined based on the determined control channel signaling window length for each window length, and transmission of repetition of download control signal is caused at the determined start position in the respective obtained window length.

20 Claims, 8 Drawing Sheets

(51) Int. Cl.
*H04L 1/08* (2006.01)
*H04L 1/18* (2006.01)

(56) References Cited

U.S. PATENT DOCUMENTS

| | | | | |
|---|---|---|---|---|
| 2009/0180436 | A1* | 7/2009 | Vujcic | H04L 5/0091 370/330 |
| 2010/0110947 | A1* | 5/2010 | Kitazoe | H04L 5/0007 370/310 |
| 2010/0297991 | A1* | 11/2010 | Dahlman | H04L 1/08 455/422.1 |
| 2012/0063370 | A1 | 3/2012 | Worrall | |
| 2013/0059589 | A1* | 3/2013 | Dalsgaard | H04W 36/32 455/437 |

FOREIGN PATENT DOCUMENTS

| | | |
|---|---|---|
| CN | 102055571 A | 5/2011 |
| WO | 2010/066413 A1 | 6/2010 |

OTHER PUBLICATIONS

International Search Report dated Oct. 31, 2013 in PCT/CN2013/070659 filed Jan. 18, 2013.
European Search Report dated Aug. 1, 2016 for European Application No. 13871519.8 based on PCT/CN2013/170659, 9 pages.

* cited by examiner

REPETITION TRANSMISSION FOR DOWNLINK CONTROL SIGNAL

FIELD OF THE INVENTION

The present invention generally relates to enhanced repetition transmission for downlink control signal. More particularly, the present invention addresses an apparatus, method and computer program product for enhanced repetition transmission for downlink control signal to improve machine type communication coverage.

BACKGROUND

Mobile data transmission and data services are constantly making progress, wherein such services provide various communication services, such as voice, video, packet data, messaging, broadcast, etc. Such systems may be systems for multiple-access, which are capable of supporting multiple users by sharing the available system resources. In recent years, Long Term Evolution LTE™ and Long Term Evolution Advanced LTE™-A have been specified.

Further, machine-type Communications MTC is a market that is likely to continue expanding in the future. Thereby, more and more MTC devices are targeting low-end (i.e. low cost, low data rate) applications that can be handled adequately by GSM/GPRS.

According to 3GPP RAN#57 in document [1], one challenge of low cost MTC is to enhance the coverage of low cost MTC user equipments UEs with very low data rate. Thereby, according to [1], it shall be ensured that service coverage is not worse than GSM/GPRS, at least comparable and preferably improved beyond what is possible for providing MTC services over GPRS/GSM today (assuming deployment in the same spectrum bands).

A 20 dB improvement in coverage in comparison to defined LTE cell coverage footprint as engineered for "normal LTE UEs" should be targeted apply for low-cost MTC UEs, using very low rate traffic with relaxed latency (e.g. size of the order of 100 bytes/message in uplink UL and 20 bytes/message in downlink DL, and allowing latency of up to 10 seconds for DL and up to 1 hour in uplink, i.e. not voice).

The requirement on such coverage improvement of 20 dB comes from the deployment of the low cost MTC UEs, such as, according to document [2] (RP-120715), meters tend to be installed deep inside buildings (basement etc.)

According to document [3] (TR 36.888), there is the section 5.2.1 on Methodology for performance evaluation where the link budget is used as the method for coverage analysis, and results on MCL calculation for normal FDD and normal TDD are given in Table 5.2.1.2-2 and Table 5.2.1.2-3 respectively and the table for FDD is as following.

The following table 1 shows MCL calculation for normal LTE frequency division duplex FDD according to [3]. Thereby, it is to be noted that eNB (base station) is assumed with 2 Tx (transmitters) and 2 Rx (receivers) in FDD systems.

| Physical channel name | PUCCH (1a) | PRACH | PUSCH | PDSCH | PBCH | SCH | PDCCH (1A) |
|---|---|---|---|---|---|---|---|
| Data rate(kbps) | | | 20 | 20 | | | |
| Transmitter | | | | | | | |
| (0) Max Tx power (dBm) | 23 | 23 | 23 | 46 | 46 | 46 | 46 |
| (1) Actual Tx power (dBm) | 23.0 | 23.0 | 23.0 | 32.0 | 36.8 | 36.8 | 42.8 |
| Receiver | | | | | | | |
| (2) Thermal noise density (dBm/Hz) | −174 | −174 | −174 | −174 | −174 | −174 | −174 |
| (3) Receiver noise figure (dB) | 5 | 5 | 5 | 9 | 9 | 9 | 9 |
| (4) Interference margin (dB) | 0 | 0 | 0 | 0 | 0 | 0 | 0 |
| (5) Occupied channel bandwidth (Hz) | 180000 | 1080000 | 360000 | 360000 | 1080000 | 1080000 | 4320000 |
| (6) Effective noise power = (2) + (3) + (4) + 10 log((5)) (dBm) | −116.4 | −108.7 | −113.4 | −109.4 | −104.7 | −104.7 | −98.6 |
| (7) Required SINR (dB) | −7.8 | −10.0 | −4.3 | −4.0 | −7.5 | −7.8 | −4.7 |
| (8) Receiver sensitivity = (6) + (7) (dBm) | −124.24 | −118.7 | −117.7 | −113.4 | −112.2 | −112.5 | −103.34 |
| (9) MCL = (1) − (8) (dB) | 147.2 | 141.7 | 140.7 | 145.4 | 149.0 | 149.3 | 146.1 |

According to document [1], the 20 dB improvement in coverage is in comparison to the defined LTE coverage footprint as engineered for "normal UE", whereby the minimum MCL in the above mentioned tables can be used as reference for comparison to get the 20 dB improvement. Based on the results in above table, the required improvement for each channel as shown can be obtained as is shown in table 2 below.

Table 2 shows MCL calculation for normal LTE FDD.

| Physical channel name | PUCCH (1a) | PRACH | PUSCH | PDSCH | PBCH | SCH | PDCCH (1A) |
|---|---|---|---|---|---|---|---|
| (9) MCL = (1) − (8) (dB) | 147.2 | 141.7 | 140.7 | 145.4 | 149.0 | 149.3 | 146.1 |
| Required improvement (dB) 140.7 + 20 − MCL of each channel | 13.5 | 19 | 20 | 15.3 | 11.7 | 11.4 | 14.6 |

It is obvious that with the 20 dB improvement target for the worst channel (Physical Uplink Shared Channel PUSCH in this FDD case), all the DL/UL channels have to be enhanced, including synchronization channel SCH, broadcast channel BCH and Physical Downlink Control Channel PDCCH channels.

As becomes apparent from table 2 above, about 14.6 dB need to be improved for PDCCH channel, however, this is the worst case. In particular, it can be expected that not all low cost MTC UEs are located in deep basement, then, depending on different deployments, the required coverage improvement can vary. Thus, from resource efficiency and power saving points of view it is desirable to enable the provision of various degree of coverage improvement.

In studies on UL coverage enhancement according to documents [4] and [5], transmission timing interval TTI bundling enhancements are discussed. In these studies, it had been proposed that there can be different TTI bundling length to provide various gains. However, TTI bundling currently is only applied to LTE UL transmission, if such TTI bundling or repetition is to be applied to DL control channels, there are at least following problems to be solved:

Position of the $1^{st}$ transmission;
Number of repetition/bundling length; and
Whether to use repletion/TTI bundling in DL control transmission to one UE.

However, these are specific problems for DL control channel enhancement. Taken the position of $1^{st}$ transmission as example, there is no such ambiguity in data transmission, since data transmission are scheduled via grant which implicitly or explicitly determines the time for $1^{st}$ transmission.

However for DL control channels, there is no such grant, then UE will not know when the $1^{st}$ transmission of DL control is sent. Similarly, for data transmission with TTI bundling or repletion, the repetition length can also be easily know from the grant, then there is no ambiguity at UE side on which subframes to combine during detection, while for DL control repletion, this is no such knowledge at UE side in advance. Both problems can be solved via blind detection, however, without any knowledge on start position and repetition length, a huge number of blind detections will be required, which is not desired.

As for the $3^{rd}$ problem, it occurs mainly at eNB side and will affect the resource efficiency, e.g., if eNB always assume worst coverage for the UE and always use longest repetition in transmission, the coverage can be guaranteed, however, much resource is used unnecessarily, and results in low spectrum efficiency and low throughput of the network.

Hence, there is the need to avoid/reduce the problems mentioned above in downlink control channel repetition.

REFERENCES

[1] 3GPP RP-121441, "Updated SID on: Provision of low-cost MTC UEs based on LTE", Vodafone, Chicago, USA, 4-7 Sep. 2012;
[2] 3GPP RP-120715, "Way forward for "low-cost LTE for MTC", Vodafone, Ljubljana, Slovenia, 13-15 Jun. 2012;
[3] 3GPP TR 36.888, "Study on provision of low-cost Machine-Type Communications (MTC) User Equipments (UEs) based on LTE";
[4] 3GPP RP-111359: "Study Item Description for LTE Coverage Enhancements"; and
[5] 3GPP TR 36.824: "LTE coverage enhancements".

SUMMARY OF THE INVENTION

It is an object of the present invention to address the above problems. In particular, it is an object of the present invention to provide an apparatus, a method and a computer program product for enabling enhanced repetition transmission for downlink control signal to improve machine type communication coverage.

According to a first aspect of the present invention, a method comprises the steps of predefining one or a plurality downlink control channel signaling window lengths, determining, for each window length, a start position of a window in which repetition of download control signal is allowed based on the determined control channel signaling window length, and causing transmission of repetition of download control signal in a window predefined by length and determined by respective start position.

According to a second aspect of the present invention, an apparatus comprises at least one processor and at least one memory including computer program code, the at least one memory and the computer program code configured to, with the at least one processor, cause the apparatus at least to perform predefining one or a plurality downlink control channel signaling window lengths, determining, for each window length, a start position of a window in which repetition of download control signal is allowed based on the determined control channel signaling window length, and causing transmission of repetition of download control signal in a window predefined by length and determined by respective start position.

According to a third aspect of the present invention, a method comprises the steps of determining one or a plurality of downlink control channel signaling window lengths, obtaining, for each determined window length, a start position of a window in which repetition of download control signal is allowed based on the determined control channel signaling window length, and receiving repetition of download control signal at the determined start position in the respective obtained window length.

According to a fourth aspect of the present invention, an apparatus comprises at least one processor, and at least one memory including computer program code, the at least one memory and the computer program code configured to, with the at least one processor, cause the apparatus at least to perform determining one or a plurality of downlink control channel signaling window lengths, obtaining, for each determined window length, a start position of a window in which repetition of download control signal is allowed based on the determined control channel signaling window length, and receiving repetition of download control signal at the determined start position in the respective obtained window length.

According to a fifth aspect of the present invention, there is provided a computer program product comprising computer-executable components which, when the program is run on a computer, are configured to carry out the method according to the first aspect and/or the method according to the third aspect.

According to a sixth aspect of the present invention, an apparatus, comprises processing means for predefining one or a plurality of downlink control channel signaling window lengths, determination means for determining, for each window length, a start position of a window in which repetition of download control signal is allowed based on the determined control channel signaling window length, and control means for causing transmission of repetition of download control signal in a window predefined by length and determined by respective start position.

According to a seventh aspect of the present invention, an apparatus comprises determination means for determining one or a plurality of downlink control channel signaling window lengths, obtaining means for obtaining, for each determined window length, a start position of a window in which repetition of download control signal is allowed based on the determined control channel signaling window length, and reception means for receiving repetition of download control signal at the determined start position in the respective obtained window length.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
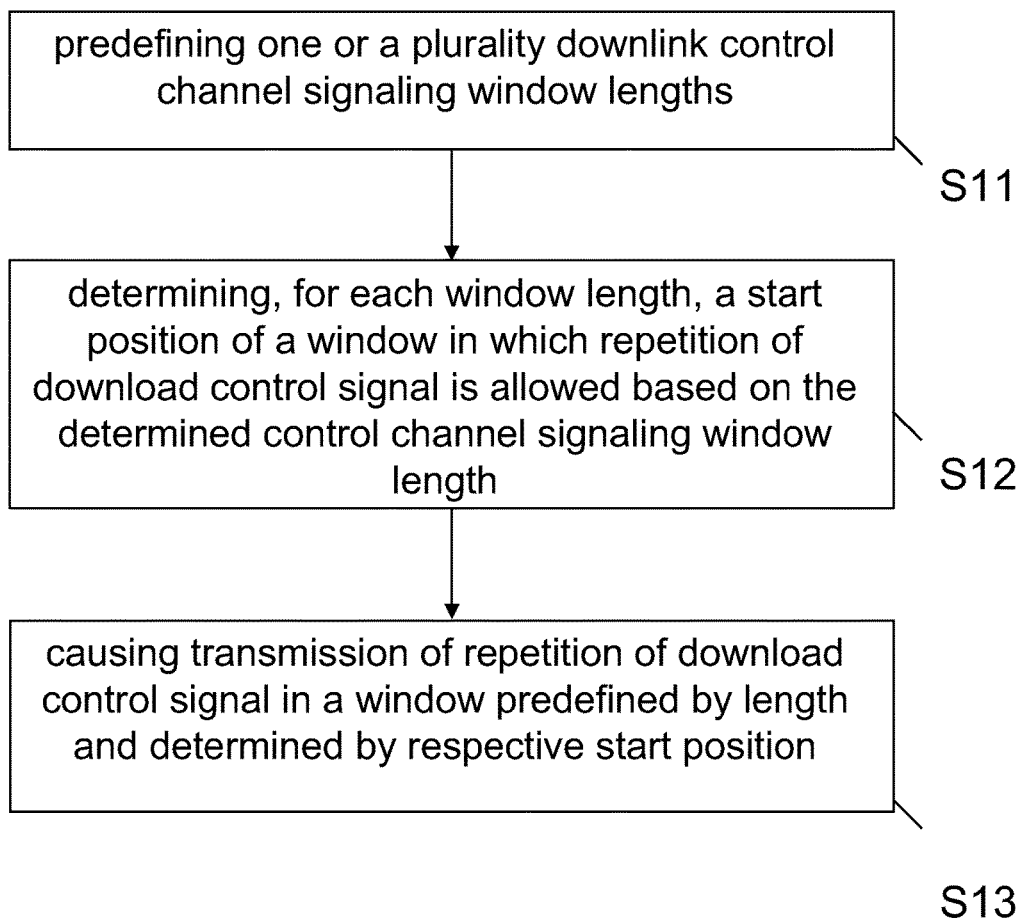
FIG. 1 shows a principle flowchart of an example for a method according to certain embodiments of the present invention.

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE™/LTE™-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to certain embodiments, in order to enable efficient repetition transmission and detection of DL control signaling, the following approaches according to the present invention are provided:

According to certain embodiments of the present invention (here: Approach#1), the repetition window structure is predefined such that the start position of the repetition window is only allowed in some subframes, which is determined by repetition window length N. In particular, according to certain embodiments:

The length-N repetition window starts at subframe i which satisfies (i mod N)=0, and N can be some predefined number, e.g., N=1, 2, 4, 8, 16, . . . , $N_{max}$; and In each repetition window with length $N_{max}$, UE is required to detect $M_i$ candidates for each or some repetition length $N_i$, wherein $M_i$ can be a function of $N_{max}$, e.g., $M_i=\min(N_{max}/N_i, 8)$.

According to further embodiments of the present invention (here: Approach#2), eNB and UE determines the repetition window size $N_i$ which to be detected based on one or multiple of the following:

The Physical Random Access Channel PRACH format used in UE's initial access;

The measured/reported reference signal received power RSRP by UE;

The radio network temporary identifier RNTI used to scramble the DL control signal;

Whether it is common or UE-specific control signal;

Whether the DL control signal is sent in common search space or UE-specific search space; and Higher layer signaling.

Still further, according to certain embodiments of the present invention (here: Approach#3), the UE blindly detects the repetition window size, and once one DL control with repetition length $N_1$ is successfully detected, the UE indicates the $N_1$ to eNB in explicit or implicit way, and $N_1$ can be different from the real repetition length N used by eNB, wherein:

In case the DL control is a DL grant, the UE will feedback acknowledgement ACK/negative acknowledgement NACK for the scheduled PDSCH in resources determined by the successfully detected DL control resource and $N_1$; And based on ACK/NACK detection, eNB can derive $N_1$, wherein the UE can indicate the $N_1$ for DL control and $N_2$ for PDSCH separately; and In case the DL control is a UL grant, the UE will send the $N_1$ together with data in Physical Uplink Shared Channel PUSCH.

FIG. 1 shows a principle flowchart of an example for a method according to certain embodiments of the present invention.

In Step S11, one or a plurality of downlink control channel signaling window lengths is/are predefined.

In Step S12, for each window length, a start position of a window in which repetition of download control signal is allowed is determined based on the determined control channel signaling window length.

In Step S13, transmission of repetition of download control signal in a window predefined by length and determined by respective start position is caused.

Figure 2:
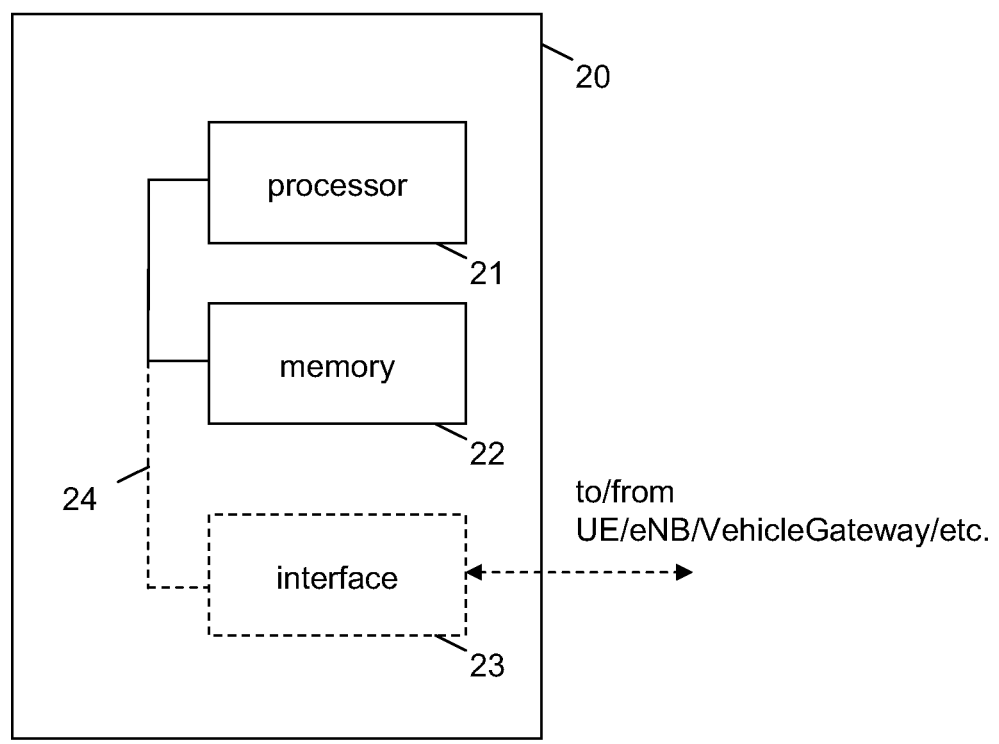
FIG. 2 shows a principle configuration of an example for an apparatus according to certain embodiments of the present invention.

FIG. 2 shows a principle configuration of an example for an apparatus according to certain embodiments of the present invention. The apparatus 20 comprises at least one processor 21 and at least one memory 42 including computer program code, which are connected by a bus 24 or the like. As indicated with a dashed line in FIG. 2, an interface 23 may optionally be connected to the bus 24 or the like, which may enable communication e.g. to/from a network entity, a base station, a UE, a vehicle gateway or the like. The at least one memory and the computer program code are arranged to, with the at least one processor, cause the apparatus at least to perform predefining one or a plurality downlink control channel signaling window lengths, determining, for each window length, a start position of a window in which repetition of download control signal is allowed based on the determined control channel signaling window length, and causing transmission of repetition of download control signal in a window predefined by length and determined by respective start position.

Figure 3:
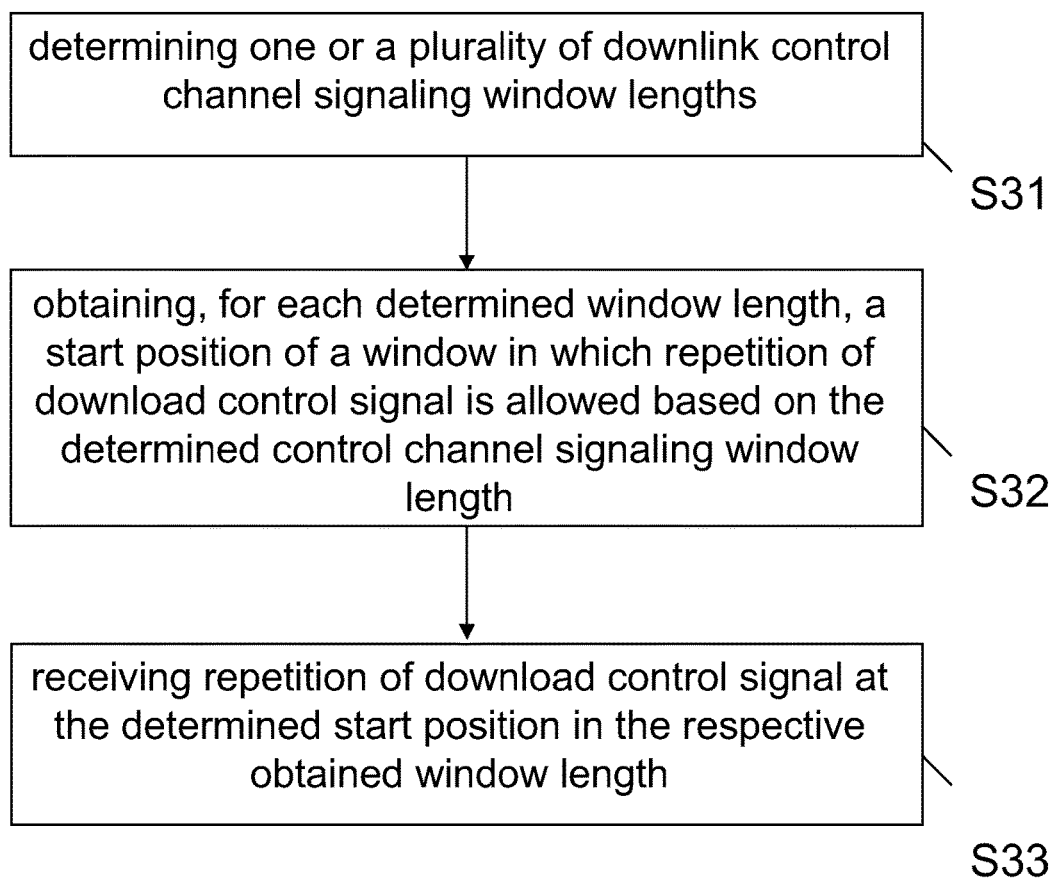
FIG. 3 shows a principle flowchart of an example for a method according to certain embodiments of the present invention.

FIG. 3 shows a principle flowchart of an example for a method according to certain embodiments of the present invention.

In Step S31, one or a plurality of downlink control channel signaling window lengths is/are determined.

In Step S32, for each window length, a start position of a window in which repetition of download control signal is allowed is obtained based on the determined control channel signaling window length.

In Step S33, repetition of download control signal is received at the determined start position in the respective obtained window length.

Figure 4:
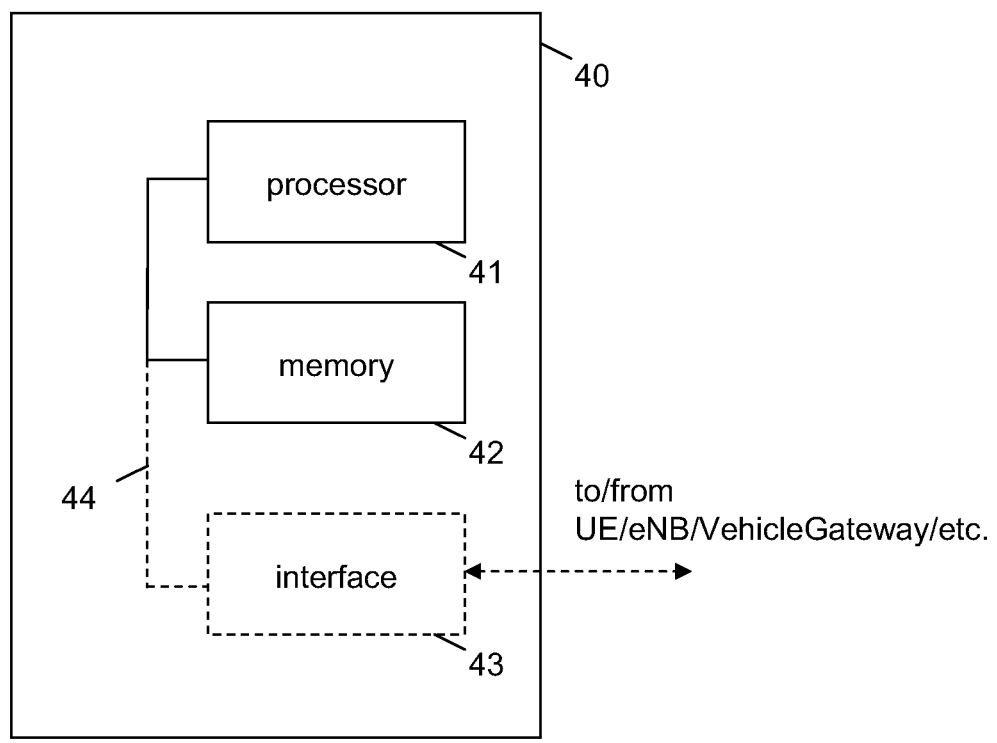
FIG. 4 shows a principle configuration of an example for an apparatus according to certain embodiments of the present invention.

FIG. 4 shows a principle configuration of an example for an apparatus according to certain embodiments of the present invention. The apparatus 40 comprises at least one processor 41 and at least one memory 42 including computer program code, which are connected by a bus 44 or the like. As indicated with a dashed line in FIG. 4, an interface 43 may optionally be connected to the bus 44 or the like, which may enable communication e.g. to/from a user equipment, a network entity, a base station, or the like. The at least one memory and the computer program code are arranged to, with the at least one processor, cause the apparatus at least to perform determining one or a plurality of downlink control channel signaling window lengths, obtaining, for each determined window length, a start position of a window in which repetition of download control signal is allowed based on the determined control channel signaling window length, and receiving repetition of download control signal at the determined start position in the respective obtained window length.

According to certain embodiments of the present invention, the predefined repetition window starts at subframe i, which satisfies (i mod N)=0;

According to certain embodiments of the present invention, the predefined repetition window length N=1, 2, 4, 8, 16, . . . , $N_{max}$, i.e., $N=2^j$, with j an integer, and $N_{max}$ the predefined maximum repetition length According to certain embodiments of the present invention, in each repetition window with length $N_{max}$, $M_i$ candidates are detected for each or some repetition length $N_i$, wherein $M_i$ is a function of $N_{max}$.

According to certain embodiments of the present invention, the function of $N_{max}$ is $M_i$=min ($N_{max}/N_i$, 8).

According to certain embodiments of the present invention, the repetition window length $N_i$ is determined based on at least one of the physical random access channel format used for initial access, the detected or/and reported reference signal received power, the radio network temporary identifier used to scramble the downlink control signal, whether it is a user equipment specific control signal, whether the downlink control signal is sent in common search space or network element specific search space, and higher layer signaling.

According to certain embodiments of the present invention, the repetition window length is blindly detected, and when one downlink control signaling with repetition length $N_1$ is successfully detected, causing indication the $N_1$ to a base station in explicit or implicit way.

According to certain embodiments of the present invention, $N_1$ is different from the real repetition length N used by the base station.

According to certain embodiments of the present invention, in case the downlink control is a downlink grant, transmission of a feedback acknowledgement or negative acknowledgement for the scheduled physical downlink shared channel in resources determined by a successfully detected downlink control resource is caused.

According to certain embodiments of the present invention, based on the acknowledgement or negative acknowledgement detection, the window length $N_1$ is determined, wherein the determined window length $N_1$ is allocated for downlink control signaling.

According to certain embodiments of the present invention, in case the downlink control is an uplink grant indication, the window length $N_1$ is transmitted together with data in physical uplink shared channel.

All the mentioned embodiments can be formed in several alternatives as illustrated but not limited to the implementation examples shown below.

The proposals apply to both Physical Downlink Control Channel PDCCH and enhanced Physical Downlink Control Channel ePDCCH, and it can together with discontinuous reception DRX to save UE power.

The proposals apply also to Physical Downlink shared Channel PDSCH.

Figure 5:
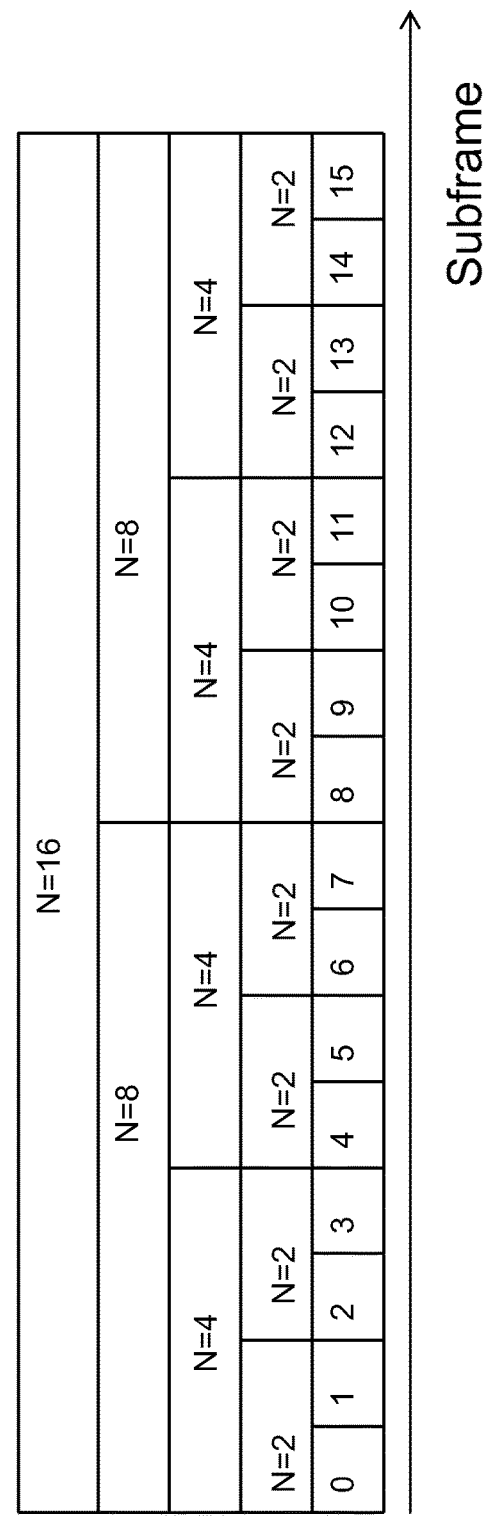
FIG. 5 shows an example of repetition window structure according to certain embodiments of the present invention.

FIG. 5 shows an example of repetition window structure. In particular, in FIG. 5, one example of the repetition window structure according to Approach#1 is shown. In this example, $N_{max}$=16, the first transmission of one DL control signal is restricted to a subframe subset, which satisfies: i mod N=0, where i is the subframe index and N is the repetition window size, or in other words, the repetition window with size N is formed by subframe k·N, k·N+1, . . . , (k+1)·N−1, where k is an integer. With this design the UE blind detection is greatly reduced, e.g., UE will not detect a DL control signal by combining subframe 1,2,3,4 or, 2,3,4,5. In case there is restriction on number of candidates to be detected in each repetition window size $N_{max}$, the blind detection can be further reduced, e.g., in case $M_i$=min (16/$N_i$, 8) candidates to be detected by UE for repetition length of $N_i$, then in each repetition window of 16 subframes, UE has to blindly detect 1 time for N=16, and 2,4,8,8 times respectively for $N_i$=8,4,2,1. And assume that in each subframe it detects with a predefined aggregation level, e.g., 32 for only one DCI size, then the number of blind detection required in the 16 subframes is 1+2+4+8+8=23.

In above example, it is assumed that UE blindly detect each possible N<$N_{max}$, however, by applying the method as in Approach#2, restriction to the $N_i$ to be detected is introduced, then the required blind detection can be further reduced.

Figure 6:
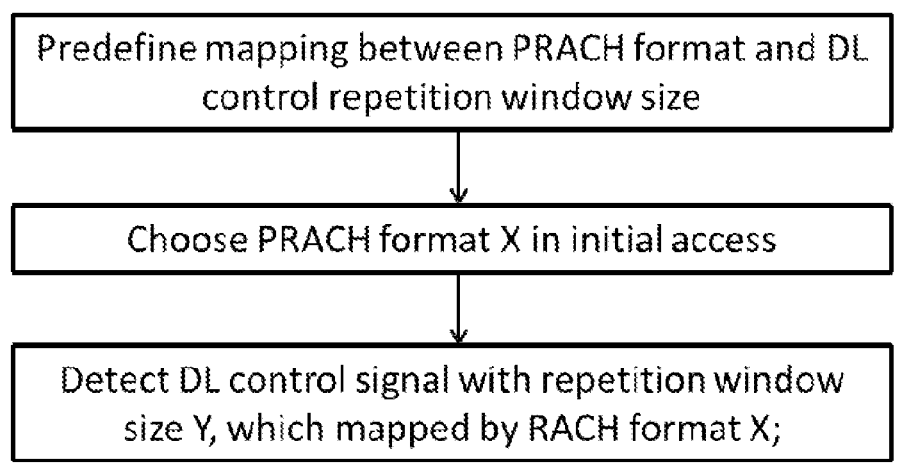
FIG. 6 shows an example of repetition window size determination according to certain embodiments of the present invention.

FIG. 6 shows an example of repetition window size determination. In particular, as is shown in the example of FIG. 6, in case there is predefined rule that the repetition window size to be detected is determined by the PRACH format used in UE's initial access, then based on the PRACH format detected/used, the eNB/UE can determine to use a single (or multiple) specific repetition window size for DL control transmission/detection. Thus, blind detection is significantly reduced.

Figure 7:
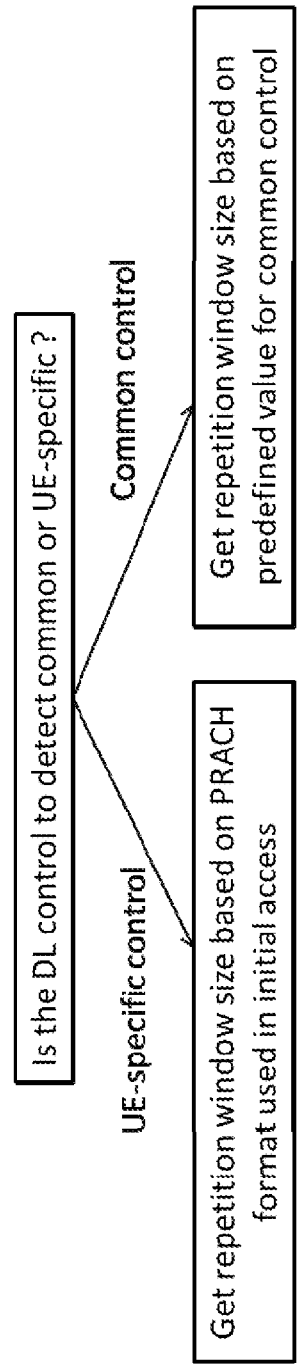
FIG. 7 shows a further example of repetition window size determination according to certain embodiments of the present invention.

FIG. 7 shows a further example of repetition window size determination. That is, according to her example according to FIG. 6, there can be predefined rule that all common control will be sent with repetition window size $N=N_1$, then in such case, blind detection of common control with other repetition window size can be avoided.

Moreover, eNB/UE can determine the repetition window size to be detected based on combination of the listed factors in Approach#2. For example, for DL control scrambled with RA-RNTI, UE will assume a repetition window size determined by the PRACH format, while for other DL control signals which to be detected after RSRP report, the repetition window size can be determined by RSRP. Or, before get further configuration via higher layer signaling, the UE assumes a default repetition window size $N=N_2$, then after get the higher layer signaling on repetition window configuration, UE detect with the configured repetition window size.

It should be noted that Approach#2 can be applied independently or in combination with Approach#1.

Figure 8:
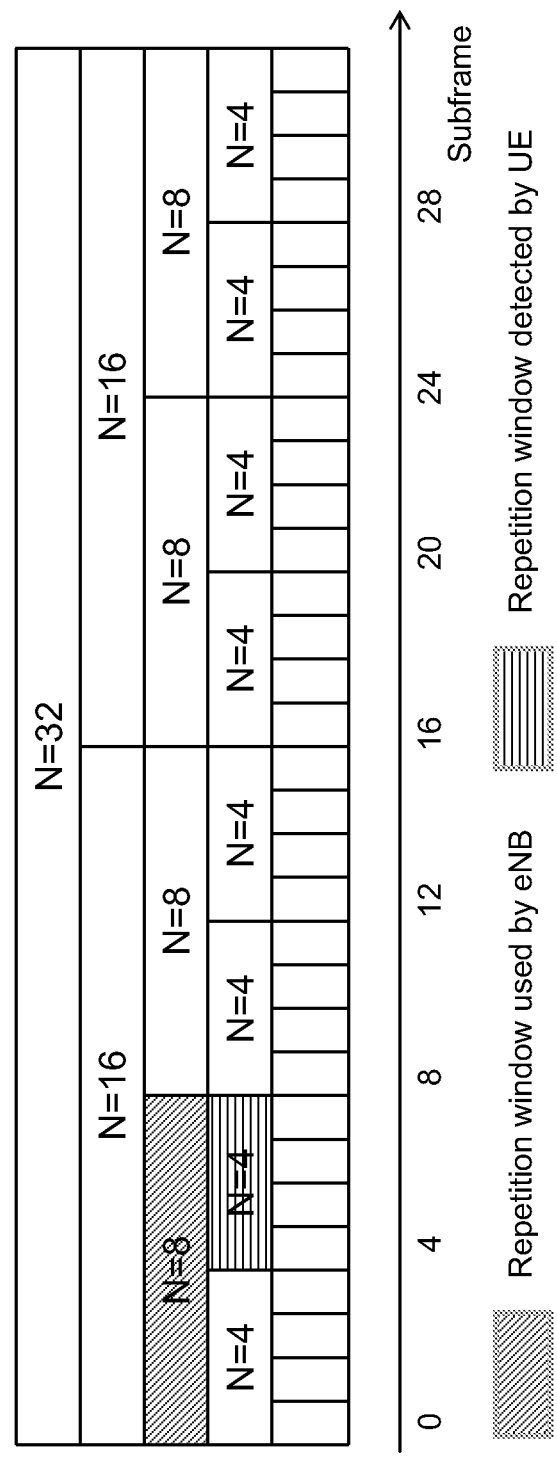
FIG. 8 shows an example for repetition window detection by UE.

The Approach#3 is to help adjust the repetition window size to improve the resource efficiency. One example thereof is shown in FIG. 8. In particular, FIG. 8 shows an example for repetition window detection by UE.

In this example, assume $N_{max}=32$, and allowed N=1,2,4,8,16,32, which are be predefined length. According to this example, it is assumed that Approach#2 is used to reduce the blind detection by restricting the repetition length to be detected to be N=4,8,16, e.g., based on its RACH format or other means in Approach 2. The eNB sends the DL control to UE with repetition window N=8 in subframe 0 to 7, but UE detect it correctly with repetition window $N_1=4$ in subframe 4 to 7. In such a case, according to certain embodiments of the present invention, the UE indicates the $N_1=4$ to eNB to enable adjustment of N at eNB side for following transmission.

Depending on whether the DL control is DL grant or UL grant, there are different ways to signal the $N_1$ to eNB. In case the DL control detected is DL grant, UE will detect the scheduled PDSCH, and then feedback ACK/NACK. The resource used for sending ACK/NACK and the repetition number of ACK/NACK is used to indicate the $N_1$ to eNB, e.g., If UE successfully detect DL control using in subframe 0,1,2,3 ACK/NACK is sent using PUCCH resource mapped by $1^{st}$ eCCE of detected DL control in subframe 0,1,2,3, which means ACK/ANCK repetition with 4 times;

If UE successfully detect DL control using in subframe 4,5,6,7 ACK/NACK is sent using PUCCH resource mapped by $1^{st}$ eCCE of detected DL control in subframe 4,5,6,7, which means ACK/ANCK repetition with 4 times; and If UE successfully detect DL control using in subframe 0,1,2, . . . , 7 ACK/NACK is sent using PUCCH resource mapped by $1^{st}$ eCCE of detected DL control in subframe 0,1,2, . . . , 7, which means ACK/ANCK repetition with 8 times.

In this example, UE will send ACK/NACK using PUCCH resource mapped by 1st eCCE of detected DL control in subframe 4,5,6,7; and based on ACK/NACK detection, eNB can derive in which subframe UE detected the DL control and the value of $N_1$, and here one implicit linkage between $N_1$ and the repetition number for ACK/NACK is assumed.

By using the feedback of ACK/NACK, UE can also suggest a repetition length $N_2$ for PDSCH besides the indication of $N_1$, e.g., If UE send ACK in PUCCH resource mapped by the $1^{st}$ eCCE of DL grant in a subframe, it means current repetition length for PDSCH is desired; and If UE send ACK in PUCCH resource mapped by the $2^{nd}$ eCCE of DL grant in a subframe, it means current repetition length for PDSCH can be reduced.

In case the DL control is a UL grant, then the $N_1$ can be transmitted together with UL data in PUSCH.

Due to fixed position or very low mobility, it is assumed that the channel does not change fast; then, once a proper repetition length is suggested by UE, it may be applied for a long time. Then during blind detection, the UE can detect first using the suggested N by itself to save power and reduce blind detection.

The present invention provides the following advantages. Firstly, it facilitates reducing/avoiding the ambiguity in repetition window size and start position. Furthermore, it facilitates reducing the required blind detection for DL control significantly and saves UE power. Moreover, it enables to determine proper repetition length based on need and improved resource efficiency.

According to certain embodiments above, it is focused on the downlink control channel repetition. However, according to further embodiments of the present invention, the same structure can also apply to PDSCH on how to determine the PDSCH repetition window in case repetition length and start position of PDSCH is not indicated to UE via DL grant.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media.

In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under LTE, LTE-A, WCDMA, WIMAX and WLAN and can advantageously be implemented in user equipments or smart phones, or personal computers connectable to such networks. That is, it can be implemented as/in chipsets to connected devices, and/or modems thereof.

According to the present invention, user equipment may refer to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
3GPP 3rd Generation Partnership Project
CCE Control Channel Element
DCI Downlink Control Information
eNB Enhanced Node B. Name for Node B in LTE
E-PDCCH Enhanced Physical Downlink Control Channel
E-PHICH Enhanced Physical Hybrid-ARQ Indicator Channel
GRPS General Packet Radio Service
GSM Global System for Mobile Communications
LTE Long Term Evolution
LTE-A Long Term Evolution Advanced
MIB Master Information Block
MTC Machine Type Communication
PDCCH Physical Downlink Control Channel
PHICH Physical Hybrid-ARQ Indicator Channel
RAT Radio Access Technology
RRC Radio Resource Control
UE User Equipment

What is claimed is:

1. A method, comprising:
defining a downlink control channel signaling window length;
determining, for the window length, a start position of a window in which repetition of a downlink control signal is allowed based on the determined control channel signaling window length; and
causing transmission of repetition of the downlink control signal in the window according to the window length and start position, wherein
the window length is defined according to at least one of a physical random access channel format used in a user equipment's initial access, a reported reference signal received power by the user equipment, a radio network temporary identifier used to scramble the downlink control signal, whether the control signal is a network element specific control signal, whether the downlink control signal is sent in common search space or user equipment specific search space, or higher layer signaling.

2. The method according to claim 1, wherein the window starts at subframe i, which satisfies (i mod N)=0.

3. The method according to claim 1, wherein the window length is $N=2^j$ subframes, wherein j is an integer.

4. The method according to claim 1, wherein the method is carried out in a base station.

5. The method according to claim 1, wherein the method is carried out in a Long Term Evolution or Long Term Evolution Advanced network architecture.

6. The method according to claim 1, wherein the downlink control channel is a Physical Downlink Control Channel (PDCCH) or an enhanced Physical Downlink Control Channel (ePDCCH).

7. An apparatus comprising:
at least one processor configured to cause the apparatus to
define a downlink control channel signaling window length;
determine, for the window length, a start position of a window in which repetition of a downlink control signal is allowed based on the determined control channel signaling window length; and
cause transmission of repetition of the downlink control signal in the window according to the window length and start position, wherein
the window length is defined according to at least one of a physical random access channel format used in a user equipment's initial access, a reported reference signal received power by the user equipment, a radio network temporary identifier used to scramble the downlink control signal, whether the control signal is a network element specific control signal, whether the downlink control signal is sent in common search space or user equipment specific search space, or higher layer signaling.

8. The apparatus according to claim 7, wherein the window starts at subframe i, which satisfies (i mod N)=0.

9. The apparatus according to claim 7, wherein the window length is $N=2^j$ subframes, wherein j is an integer.

10. The apparatus according to claim 7, wherein the apparatus is a base station.

11. The apparatus according to claim 7, wherein the apparatus is part of a Long Term Evolution or Long Term Evolution Advanced network architecture.

12. The apparatus according to claim 7, wherein the downlink control channel is a Physical Downlink Control Channel (PDCCH) or an enhanced Physical Downlink Control Channel (ePDCCH).

13. The apparatus according to claim 7, wherein
the window length is defined according to the physical random access channel format used in a user equipment's initial access.

14. The apparatus according to claim 7, wherein
the window length is defined according to the reported reference signal received power by the user equipment.

15. The apparatus according to claim 7, wherein
the window length is defined according to the radio network temporary identifier used to scramble the downlink control signal.

16. The apparatus according to claim 7, wherein
the window length is defined according to whether the control signal is a network element specific control signal.

17. The apparatus according to claim 7, wherein
the window length is defined according whether the downlink control signal is sent in common search space or user equipment specific search space.

18. A wireless terminal, comprising:
circuitry configured to
determine a downlink control channel signaling window length;
obtain, for the determined window length, a start position of a window in which repetition of a downlink control signal is allowed based on the determined control channel signaling window length; and
receive repetition of the downlink control signal at the determined start position in the respective obtained window length, wherein
the window length is defined according to at least one of a physical random access channel format used in a user equipment's initial access, a reported reference signal received power by the user equipment, a radio network temporary identifier used to scramble the downlink control signal, whether the control signal is a network element specific control signal, whether the downlink control signal is sent in common search space or user equipment specific search space, or higher layer signaling.

19. The method according to claim 18, wherein the window starts at subframe i, which satisfies (i mod N)=0.

20. The method according to claim 18, wherein the window length is $N=2^j$ subframes, wherein j is an integer.

* * * * *